Sept. 8, 1964

E. E. WALLACE 3,147,596

DUAL BRAKE SYSTEM

Filed Oct. 31, 1962

3 Sheets-Sheet 1

INVENTOR
EUGENE E. WALLACE
BY *Gravely, Lieder & Woodruff*
ATTORNEYS

Sept. 8, 1964

E. E. WALLACE 3,147,596

DUAL BRAKE SYSTEM

Filed Oct. 31, 1962

3 Sheets-Sheet 2

INVENTOR
EUGENE E. WALLACE
BY *Gravely, Lieder*
*& Woodruff*
ATTORNEYS

Sept. 8, 1964
E. E. WALLACE
3,147,596
DUAL BRAKE SYSTEM
Filed Oct. 31, 1962
3 Sheets-Sheet 3
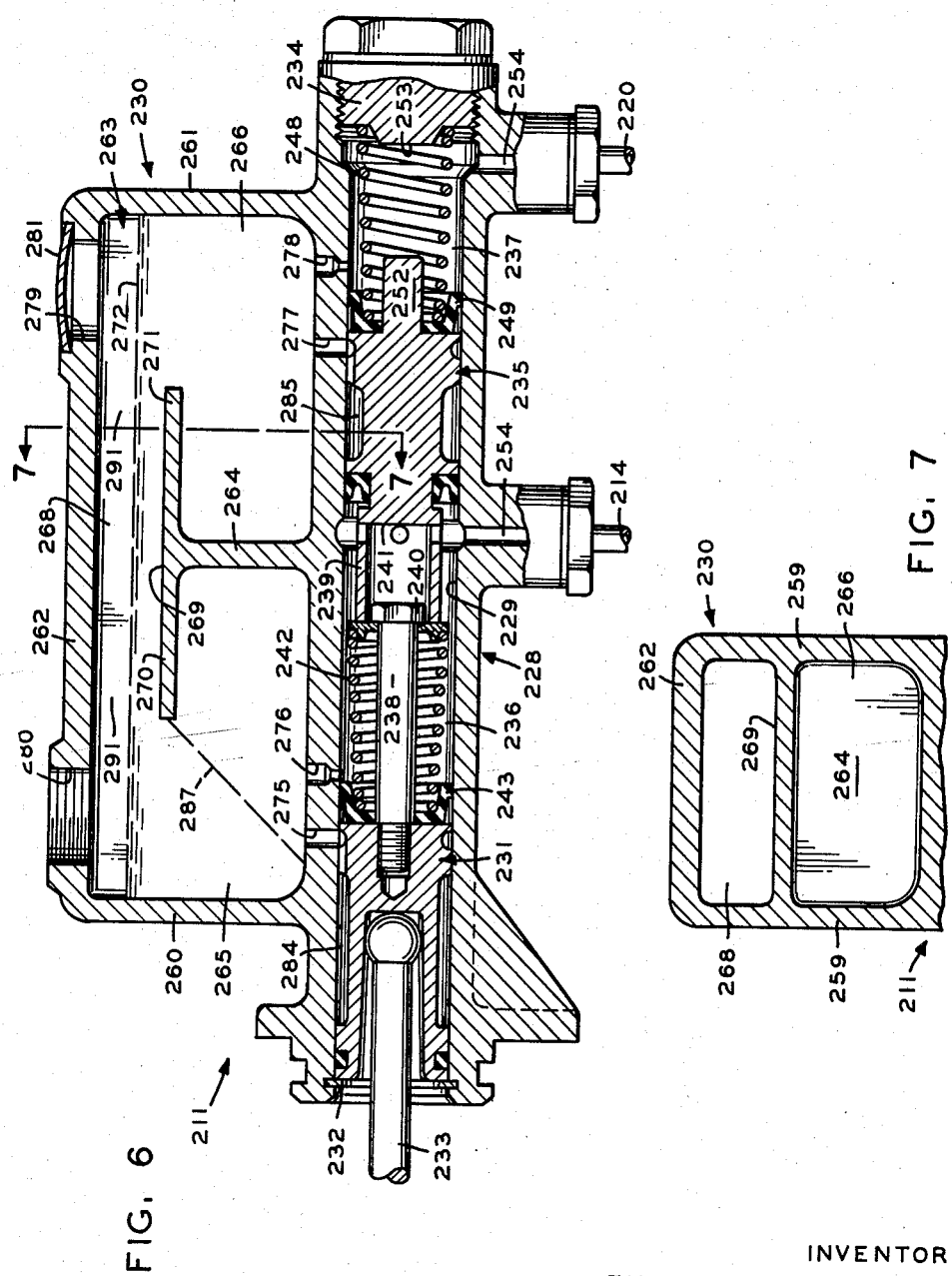
INVENTOR
EUGENE E. WALLACE
BY *Gravely, Lieder & Woodruff*
ATTORNEYS

United States Patent Office 3,147,596
Patented Sept. 8, 1964

3,147,596
DUAL BRAKE SYSTEM
Eugene E. Wallace, Kirkwood, Mo., assignor to Wagner Electric Corporation, St. Louis, Mo., a corporation of Delaware
Filed Oct. 31, 1962, Ser. No. 234,483
9 Claims. (Cl. 60—54.6)

This invention relates generally to the hydraulic brake art and more particularly to improvements in fluid compensation for dual brake systems.

The principal object of the present invention is to provide a dual brake system in which the integrity of one branch is assured in the event of failure of the other branch.

Another object is to provide novel pressure fluid reservoir means having isolated supply portions for the pressure developing chambers of a dual master cylinder, and having a common main reservoir portion to supply fluid to portions isolated from each other.

Another object is to provide a dual brake system that will give a warning to the operator that partial failure has occurred while assuring a source of pressure fluid to an operative branch of the system.

These and other objects and advantages will become more apparent hereinafter.

Briefly, the invention is embodied in a dual master cylinder including pressure fluid reservoir means having an upper main reservoir portion and a lower sump portion, a vertical wall dividing the lower sump portion transversely to form front and rear sump chambers for fluid compensation to front and rear master cylinder chambers, and passage means providing fluid communication throughout the main reservoir portion above both sump chambers, the passage means extending on both sides of the vertical wall and preventing fluid communication between the sump portions when the fluid level in the sump chambers is below a predetermined level.

The invention also consists in the parts and in the combinations and arrangements of parts hereinafter described and claimed.

Figures 1, 3:
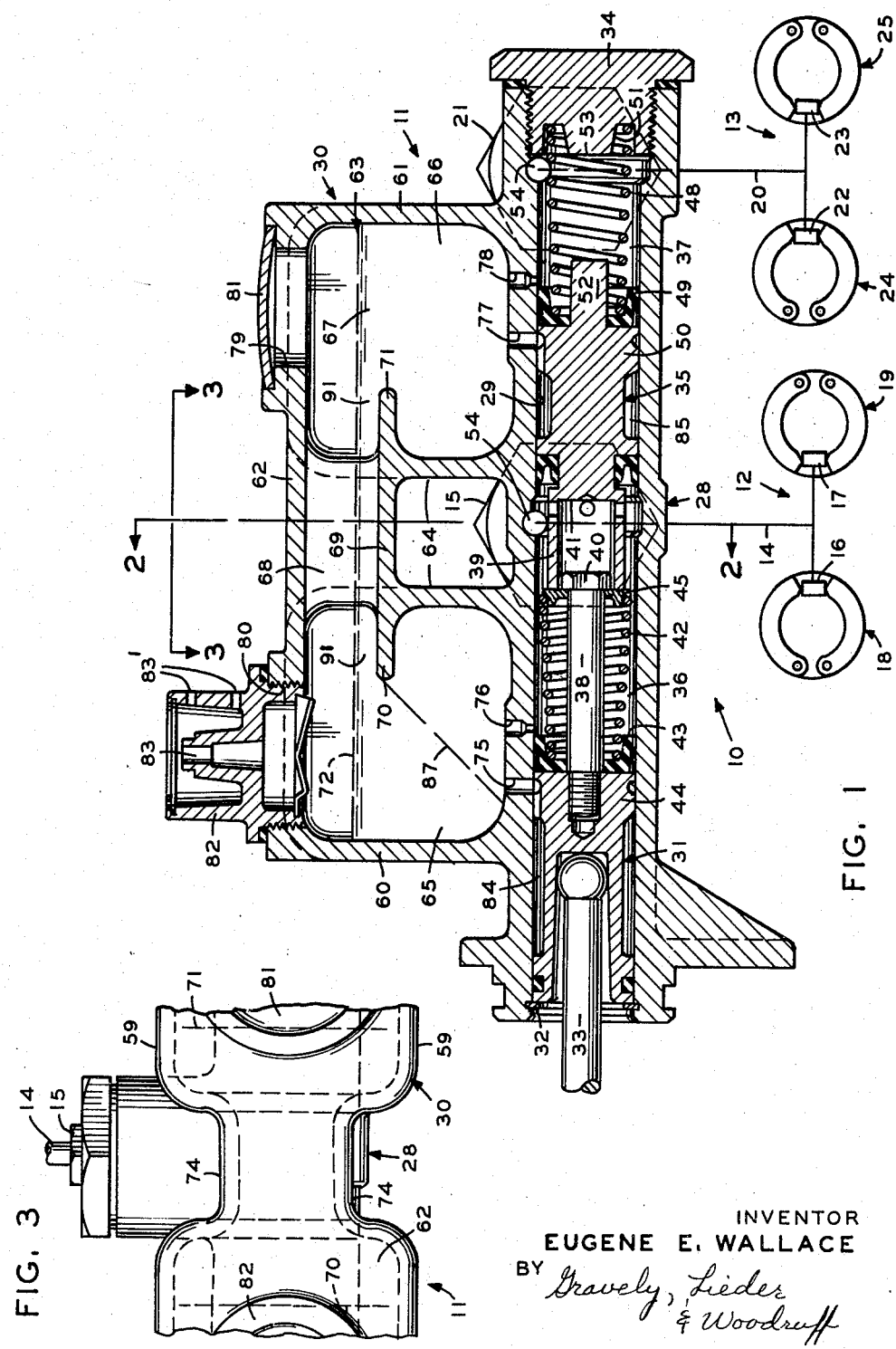
Figure 2:
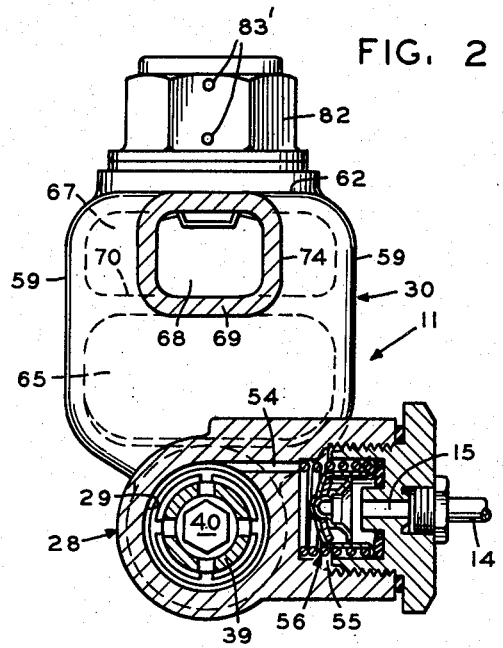
Figure 5:
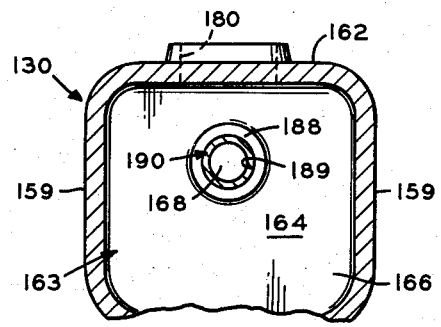
Figure 4:
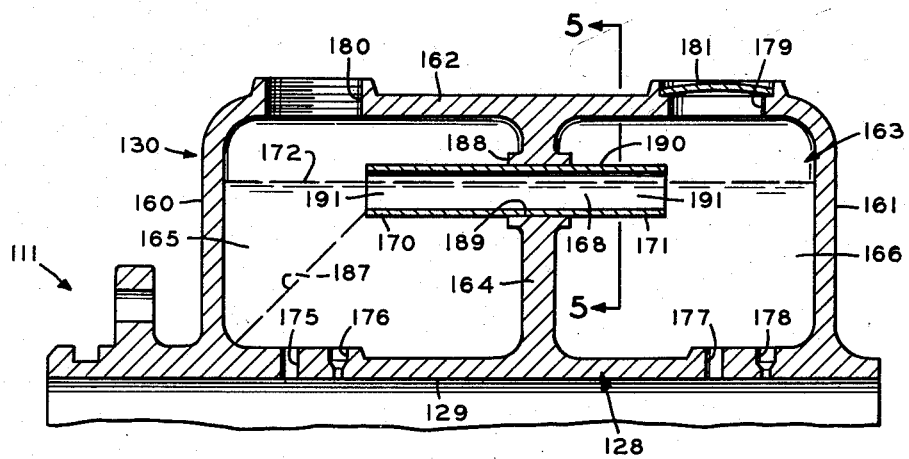

In the accompanying drawings which form a part of this specification and in which similar numerals refer to like parts wherever they occur:

FIG. 1 is a simplified diagrammatic view of a brake system, showing in section a dual master cylinder embodying the invention, FIG. 2 is a cross-sectional view of the master cylinder taken substantially along line 2—2 of FIG. 1, FIG. 3 is a fragmentary top plan view taken substantially along line 3—3 of FIG. 1, FIG. 4 is a fragmentary sectional view showing modified reservoir means for the master cylinder of FIG. 1, FIG. 5 is a cross-sectional view taken along line 5—5 of FIG. 4, FIG. 6 is a sectional view showing another modified reservoir means, and FIG. 7 is a cross-sectional view taken along line 7—7 of FIG. 6.

Referring now to FIGS. 1, 2 and 3 of the drawings, it will be seen that a simplified dual brake system 10 shown for illustration of the present invention comprises a dual master cylinder or pressure generating means 11 for developing fluid pressures in rear and front wheel brake branches 12 and 13. The rear wheel branch 12 includes a conduit 14 connected to a first outlet 15 of the master cylinder 11, the conduit 14 branching to connect to fluid motors 16 and 17 of the rear wheel brake assemblies 18 and 19. The front wheel branch 13 has a conduit 20 connected to a second outlet 21 of the master cylinder 11, the conduit 20 branching to connect to fluid motors 22 and 23 of the front wheel brake assemblies 24 and 25. Other connections of fluid motors can be made to the two branches 12 and 13.

The master cylinder 11 has a main cylinder housing 28 with a bore 29 and a reservoir housing 30 is provided above the main housing 28. A first piston assembly 31 is normally positioned in the leftward end of the bore 29 in abutment with a snap ring 32, and is adapted to receive an operator applied force through push rod 33 for sliding movement rightwardly in the bore 29. The rightward end of the bore 29 is closed by an end plug 34, and a second piston assembly 35 is positioned intermediate the first piston assembly 31 and the end plug 34 to define first and second working or pressure generating chambers 36 and 37 having the outlets 15 and 21, respectively. The first piston assembly 31 has an axial projection 38 extending through the first chamber 36 and slidably received in a sleeve 39 integrally formed on the leftward end of the second piston assembly 35. The end 40 of the projection 38 is normally maintained in a predetermined lost-motion connection with an opposing wall 41 of the second piston assembly 35. The second piston assembly 35 is positioned in the bore 29 by spring means including a return spring 42 having one end seated against a piston cup 43 carried on the head portion 44 of the first piston assembly 31 and its other end seated on a spring retainer member 45 carried on the end of the sleeve 39 of the second piston assembly 35. The spring means also includes a return spring 48 having one end seated on an annular piston cup 49 carried on the head portion 50 of the second piston assembly 35 and its other end seated in an annular groove 51 of the end plug 34. The second piston assembly 35 also includes an integral axial projection 52 adapted for limited lost-motion connection through the second chamber 37 with an opposed abutment 53 on the end plug 34 under certain conditions of loss of fluid from the second branch 13, as will appear.

Referring to FIG. 2, each of the chambers 36 and 37 is in communication with the outlet therefor through a lateral or transverse passage 54 extending from the bore 29 to an outlet chamber 55 having a check valve assembly 56 therein. The valve assembly 56 is a two-way valve to permit pressure fluid flow in either direction when the pressure exceeds a predetermined minimum magnitude that assures a slight positive pressure in the branches 12 and 13.

The reservoir housing 30 is positioned above the main cylinder housing 28 and includes opposed side walls 59, rear and front end walls 60 and 61, and a top wall 62. The housing 30 defines reservoir means, shown generally at 63, for pressure fluid compensation to the pressure generating chambers 36 and 37. The reservoir means 63 is divided transversely of the main cylinder bore 29 by vertical wall means 64 to form isolated rear and front sump chamber portions 65 and 66 in the lower portion thereof. A main supply chamber 67 is provided in the upper part of the reservoir means 63 to supply pressure fluid to each of the sump chambers 65 and 66, the main chamber 67 including a horizontal passage 68 formed between the top wall 62 and a horizontal table or wall 69 spanning the wall means 64. The table 69 has projecting shelves 70 and 71 extending rearwardly and forwardly of the wall means 64 and between the side walls 59 to define the upper limit of the sump chambers 65 and 66, respectively. The normal pressure fluid level in the main supply chamber 67 is shown in broken lines and designated 72. It will be noted in FIGS. 1, 2 and 3 that the side walls 59 of the reservoir housing 30 are recessed, at 74, whereby the passage 68 is restricted relative to the main supply chamber size on each side of the passage above the shelves 70 and 71. Fluid supply and compensation means for the master cylinder chambers 36 and 37 includes supply and compensation ports 75 and 76 connecting the rear sump chamber 65 with the bore 29 and the first or rear working chamber 36, and supply and compensation ports 77 and 78 connecting the front sump chamber 66 with the bore 29 and the second or front working chamber 37.

The reservoir housing 30 is also provided with front and rear openings 79 and 80 in its top wall 62, the former being sealed by a disc member 81 and the latter being tapped and receiving a removable filler plug 82 having atmospheric ports 83 and 83'.

The master cylinder 11 is mounted on a vehicle (not shown) in a usual manner with the piston assemblies 31 and 35 arranged for tandem reciprocation in the cylinder bore 29 in the same direction of movement as the vehicle.

In the normal operation of the dual brake system 10, an operator applied force on the push rod 33 moves the piston assembly 31 rightwardly in the bore 29 to displace pressure fluid from the first working chamber 36 through the outlet chamber 55, outlet 15 and conduit 14 into the fluid motors 16 and 17 to energize the wheel brake assemblies 18 and 19. The fluid pressure created in the first chamber 36 and the first branch 12 is also effective on the effective area of the second or servo piston assembly 35 creating a force to move the servo piston rightwardly in the bore 29 to create a substantially equal fluid pressure in the second working chamber 37. The fluid thus displaced from the second chamber 37 is transmitted through the second branch 13 to the fluid motors 22 and 23 to energize the front wheel brake assemblies simultaneously with the energization of the rear brake assemblies 18 and 19.

When the manual forces are released from the push rod 33, pressure fluid is returned to the master cylinder chambers and the piston assemblies 31 and 35 are returned to their original positions by the force of the return springs 42 and 48. As the manual forces are released, a partial vacuum may be momentarily created in the pressure chambers 36 and 37, and pressure fluid compensation is provided by flow from the sump chambers 65 and 66 through supply ports 75 and 77 into low pressure chambers 84 and 85 behind or leftwardly of the head portions 44, 50 and sealing cups 43, 49 of the piston assemblies 31 and 35, respectively. Pressure fluid then flows from the low pressure chambers 84 and 85 past the sealing lips of the cups 43 and 49, which are in collapsed condition due to the partial vacuums, and into the working or high pressure chambers 36 and 37. Fluid compensation in the chambers 36 and 37 is provided by pressure fluid passage through the compensation ports 76 and 78 to or from the sump chambers 65 and 66 of the reservoir 63.

In the event of a leak in either fluid pressure branch 12 or 13, the manual applied forces will continue to displace fluid from the working chambers 36 and 37, and pressure fluid will be lost through the leak so that the volume of pressure fluid in the reservoir 63 will be depleted. If a leak occurs in the first fluid pressure branch 12 of the system 10, the applied force on the piston assembly 31 will move this assembly in the chamber 36 relative to the servo piston assembly 35 so that the projection 38 will abut the surface 41. The piston assemblies 31 and 35 will then move in concert to create a fluid pressure in the second working chamber 37 to energize the brake assemblies 24 and 25 of the second fluid pressure branch 13 of the system. If a leak occurs in the second fluid pressure branch 13, the applied force on the first piston assembly 31 will move it rightwardly creating a fluid pressure in the first working chamber 36 which will act on the effective area of the servo piston assembly 35 to move it rightwardly in the bore 29 into abutment with the surface 53 of the end plug 34. Further movement of the first piston assembly 31 then creates an intensified fluid pressure to energize the brake assemblies 18 and 19 of the first branch 12.

It will be understood that one set of brakes on a vehicle will remain operative if the other set fails, and the operator will be aware of this loss since a longer pedal stroke is required before any braking effort can be felt.

When the vehicle is decelerated, the inertia effect of vehicle deceleration on pressure fluid in the reservoir 63 causes the pressure fluid to be thrown forwardly in the reservoir. As long as the fluid level remains above the plane of the table 69, unrestricted passage of fluid will occur. However, as pressure fluid is lost from the reservoir so that the fluid level falls below the table 69 or passage 68, fluid transfer from the first sump chamber 65 to the second sump chamber 66 through the main reservoir chamber 67 (or in the opposite depending upon whether deceleration is in a forward or reverse direction of the vehicle) will occur only by reason of the inertia effect on the pressure fluid whereby the fluid level becomes angular with respect to horizontal as the fluid mass tends to flow in the direction of vehicle movement and pile up against the wall 64. The forward portion thus rises to the shelf 70 and the following mass tends to be slopped into the second sump chamber 66. The broken line 87 in the first sump chamber 65 represents a maximum degree of angularity attained by the fluid level in response to a 1 g forward stop and is substantially 45°. In other words, the portion of the first sump chamber 65 defined by the line 87, shelf 70, vertical wall 64 and the outside walls 59 and reservoir bottom wall (or main cylinder housing 28) represents the minimum volume of fluid that will be retained in each sump chamber due to a maximum inertia effect of deceleration or acceleration.

If a leak occurs in the second branch 13, the pressure fluid will be reduced in the reservoir 63 and each subsequent vehicle deceleration will cause a portion of fluid to be transferred from the first sump chamber 65 to the second sump chamber 66 and to be depleted due to the leak. However, when the fluid level in the first sump chamber is reduced to a predetermined low level, the shelf 70 and vertical wall 64 act as a dam to prevent further transfer of pressure fluid from the first sump chamber 65 to the second sump chamber 66 in response to the inertia effect of vehicle deceleration. Therefore, the shelf and wall means 70, 64 serve to maintain a substantial supply of pressure fluid in the first sump chamber 65 for use in the first fluid pressure branch 12 while the pressure fluid in the sump chamber 66 is depleted by reason of the leak in the second fluid pressure branch 13. Similarly, the shelf 71 and wall 64 maintain a supply of pressure fluid in the second sump chamber 66 in the same manner in respect of reverse stops, acceleration and the like, if a leak occurs in the first fluid pressure branch 12.

It should also be noted that the passage 68 is restricted by the recesses 74 in the side walls 59 relative to the size of the transverse space over the shelves 70 and 71 forming inlet or outlet end areas 91 to the passage 68, whereby the rate of spillage between the sump chambers 65 and 66 may be controlled in this manner.

Referring to FIGS. 4 and 5, the dual master cylinder 111 includes a modified reservoir housing 130 having straight side walls 159 and otherwise being similar in external construction to the reservoir housing 30 in the FIGS. 1, 2 and 3 embodiment. Within the reservoir housing 130, the reservoir means 163 include vertical wall means 164 extending between the top wall 162 and the main cylinder housing 128, and the vertical wall means 164 is provided on opposite sides with integral bosses 188 having a through opening 189 receiving a tubular member 190 defining passage 168. The tubular member 190 has end portions 170 and 171 extending beyond the vertical wall 164 to provide inlet or outlet end areas 191 spaced therefrom. The main supply chamber 167 of the reservoir means 163 includes the passage 168 and the sump chamber portions 165 and 166 are below the tubular member portions 170 and 171.

It will be understood that the operation of the dual master cylinder 111 is the same as previously described and that the fluid passage or transfer due to the inertia effect produced by vehicle deceleration is substantially similar to the embodiment shown in FIGS. 1, 2 and 3. However, due to the projection of the tubular member 190 into the reservoir means 163 and the reduced area of the passage 168, the rate of fluid transfer attributable to the inertia effect is greatly prolonged since the amount of pressure fluid being received into the passage 168 in any deceleration or acceleration of the vehicle will be smaller.

Although the tubular member 190 is shown positioned intermediate the side walls 159 substantially on the transverse vertical center line of the wall 164, the member 190 may be moved laterally or transversely to one side of the vertical wall 164.

Referring now to FIGS. 6 and 7, the dual master cylinder 211 is similar to that shown in FIGS. 1, 2 and 3 and includes a reservoir housing 230 that is modified only by providing a single vertical wall 264 (instead of the double vertical wall 64) and by forming straight side walls 259 to eliminate any restriction in the passage 268. This embodiment represents a change in construction of reservoir means 230 that will still provide for the retention of a predetermined amount of pressure fluid in either sump chamber 265 or 266 in the event a leak occurs to produce loss of fluid from the other sump chamber.

It will now be apparent that the present invention provides for pressure fluid compensation to dual master cylinder chambers from isolated sump chambers of reservoir means having a main fluid supply portion common to both sump chambers and means for limiting fluid transfer between said sump chambers in response to the inertia effect of vehicle deceleration or the like. The vehicle operator, therefore, has a safety factor in the provision of two brake branches so that one will remain operative in the event of failure of the other branch, and yet has a warning of the partial failure.

The foregoing description and accompanying drawings are provided by way of illustration and example and changes or modifications which may be apparent to one skilled in the art are contemplated as being within the scope of the present invention which is limited only by the claims which follow.

What is claimed is:

1. In a fluid pressure generating device for a vehicle, including first and second fluid pressure generating portions; a pressure fluid reservoir comprising first and second separated sump means for supplying fluid to said first and second portions, a main supply portion above said sump means and in pressure fluid communication therewith, and means in said reservoir for maintaining a predetermined amount of pressure fluid in said sump means and preventing pressure fluid transfer between said sump means in response to changes of velocity of the vehicle.

2. In a fluid pressure generating device for a vehicle, including first and second fluid pressure generating portions adapted to generate fluid pressure for deceleration of the vehicle, a pressure fluid reservoir for said device comprising first and second main supply and sump chambers in fluid pressure communication with said first and second fluid pressure generating portions, and means in said reservoir interconnecting said first and second main supply chambers to normally permit the transfer of pressure fluid therebetween in response to the inertia effect of vehicle deceleration on the pressure fluid and separating said first and second main supply and sump chambers to prevent such transfer of pressure fluid upon depletion of the pressure fluid in said reservoir to a predetermined amount in said sump chambers.

3. In a fluid pressure generating device for a vehicle, including first and second fluid pressure generating portions; a pressure fluid reservoir divided transversely of the direction of vehicle movement to form separated front and rear sump chambers for supplying fluid to said pressure generating portions, an upper supply portion above each of said sump chambers, and passage means between said upper supply portions and forming therewith a main reservoir chamber, said passage means being formed by wall means having inlet and outlet ends arranged in said reservoir to limit to a predetermined minimum the amount of pressure fluid retained in either sump chamber due to pressure fluid transfer between said sump chambers in response to changes of velocity of the vehicle.

4. The fluid pressure generating device according to claim 3 in which said passage means has a restricted portion intermediate the inlet and outlet ends.

5. In a fluid pressure generating device for a vehicle, including first and second pressure generating portions, a pressure fluid reservoir comprising a housing including vertical wall means defining separated front and rear sump chambers for supplying pressure fluid to said pressure generating portions, a main supply chamber positioned above said sump chambers and including transverse wall means extending from said vertical wall means and forming a passage interconnecting said sump chambers for normal pressure fluid transfer therebetween, said transverse wall means and vertical wall means together forming a dam across said reservoir to limit pressure fluid transfer between said sump chambers in response to changes of velocity of the vehicle upon predetermined loss of pressure fluid from said reservoir.

6. The fluid pressure generating device according to claim 5 in which the transverse wall means comprises a horizontally extending baffle member on said vertical wall means and forming shelf means projecting into said reservoir above each sump chamber.

7. The fluid pressure generating device according to claim 6 in which the sides of said passage are defined by reservoir side walls having recessed portions forming a restriction in said passage.

8. The fluid pressure generating device according to claim 5 in which said vertical wall means divides the reservoir laterally, and said transverse wall means comprises a tubular member extending through said vertical wall means.

9. A dual brake system for a vehicle, comprising a first fluid pressure branch for operating one set of brakes and a second fluid pressure branch for operating another set of brakes, first and second expansible chambers in said first and second branches including first and second piston assemblies movable therein in a fluid pressure generating direction, said sets of brakes being energized to decelerate the vehicle upon movement of said first and second piston assemblies in a fluid pressure generating direction in said first and second chambers; a reservoir for storing pressure fluid, vertical wall means in said reservoir forming separated first and second sump chamber portions, first and second supply port means connecting said first and second sump chamber portions in pressure fluid communication with said first and second chambers to compensate for pressure fluid depletion therein, an upper main supply chamber portion in said reservoir over said first and second sump chamber portions for normally supplying pressure fluid thereto, and other wall means extending transversely of said vertical wall means and defining a fluid passage forming a portion of said main supply chamber portion, said other wall means projecting from said vertical wall means on each side thereof to partially define the upper limit of said sump chamber portions and said other wall means having unattached outer ends, said fluid passage defined by said other wall means normally accommodating free pressure fluid flow to both sump chamber portions and permitting limited transfer of pressure fluid therethrough between said first and second sump chamber portions upon depletion of fluid from said main supply chamber portion and in response to the inertia effect of vehicle deceleration on the pressure fluid in said sump chamber portions and substantially obviating transfer of pressure fluid upon depletion of the pressure fluid in said sump chamber portions to a predetermined amount to maintain thereby a supply of pressure fluid in one of said first and second sump chamber portions to preserve the pressure generating potential of at least one of said first and second branches and assure energization of the set of brakes connected therein regardless of further depletion of the pressure fluid from the other of said first and second sump chamber portions and the consequent loss of the fluid pressure generating potential of the other of said first and second branches to energize the set of brakes connected therein.

References Cited in the file of this patent

UNITED STATES PATENTS

| | | |
|---|---|---|
| 2,074,361 | Bowen | Mar. 23, 1937 |
| 2,115,995 | McInnerney | May 3, 1938 |
| 2,747,372 | York | May 29, 1956 |
| 2,811,600 | Storck et al. | Oct. 29, 1957 |
| 2,992,535 | Barragan | July 18, 1961 |